Jan. 27, 1959  J. V. SHERIDAN  2,870,574
HYDROPONIC UNIT WITH COMPRESSIBLE RESERVOIR
Filed April 5, 1956  2 Sheets-Sheet 1
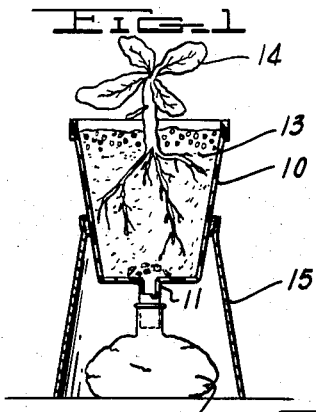
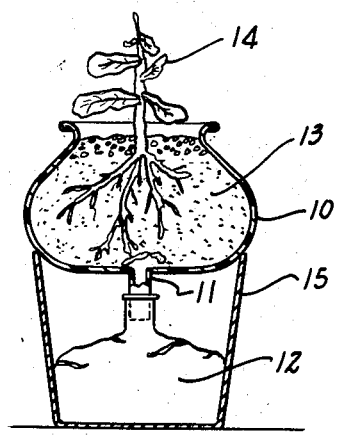
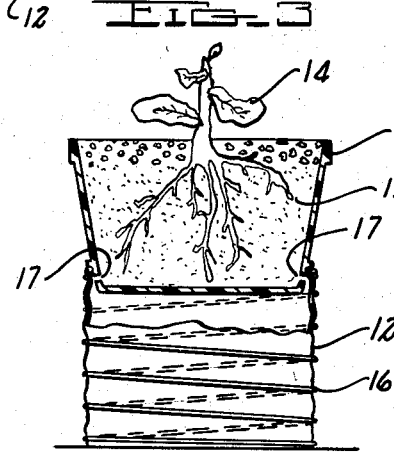
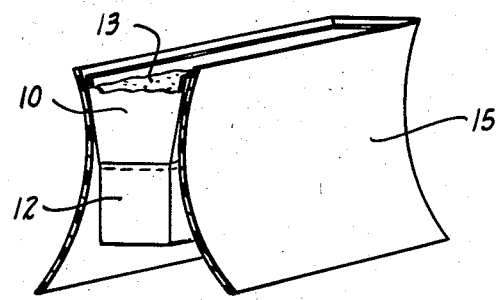
INVENTOR.
JAMES V. SHERIDAN
BY
KOTTS & SHERIDAN
ATTORNEYS Jan. 27, 1959     J. V. SHERIDAN     2,870,574
HYDROPONIC UNIT WITH COMPRESSIBLE RESERVOIR
Filed April 5, 1956     2 Sheets-Sheet 2
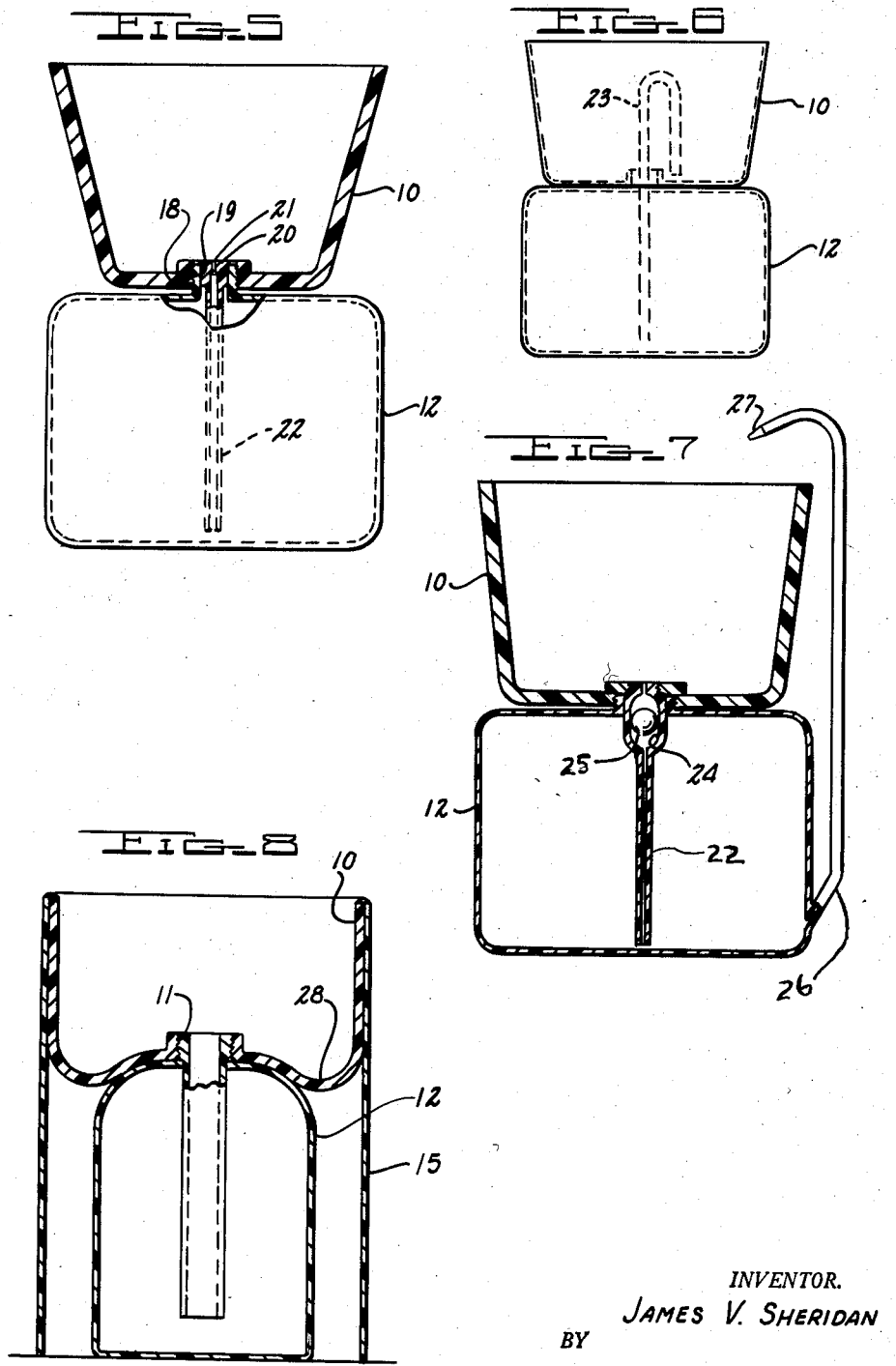
INVENTOR.
JAMES V. SHERIDAN
BY
KOTTS & SHERIDAN
ATTORNEYS

United States Patent Office 2,870,574
Patented Jan. 27, 1959

2,870,574

HYDROPONIC UNIT WITH COMPRESSIBLE RESERVOIR

James V. Sheridan, Detroit, Mich.

Application April 5, 1956, Serial No. 576,291

4 Claims. (Cl. 47—1.2)

This invention concerns a structure useful for the growing of plants and is more particularly concerned with a hydroponic unit suitable for household use.

Hydroponic growing has been used widely by amateur and professional growers and by research groups interested in studying the exact effect and effective proportion of specific plant nutrient elements. Nutrient formulas have been developed at several universities and state agricultural stations and nutrient mixtures have been packaged and sold in retail stores for use as "stimulants for ailing houseplants." A half dozen books, popular magazine articles, and numerous scientific papers have kept the public up-to-date on the development of the subject.

Despite the widespread interest and wealth of information on the subject, the housewife has not been provided with a simple, portable, and practical hydroponicum for her house plants nor has the agriculture student been supplied with such a unit for his individual studies or individual laboratory assignments.

Although an early and widely used hydroponic system involves supporting the plant on a wire mesh and permitting the plant roots to extend into a pool of water, the most successful hydroponic systems for general use involve planting the plant in a bed of gravel, sand, vermiculite, cinders, or the like and then pumping into the bed a nutrient liquid which is located in a conveniently located reservoir. Large greenhouse units normally have a pump from which the nutrient is pumped into the bed by subirrigation until the bed is full, the liquid then returning to a sump by gravity flow.

Small hydroponicums have used pumps but these are usually quite awkward and become increasingly more difficult to control as the growing unit becomes smaller. An attempt has been made to use a siphon system or a two way gravity system on small units; that is, by alternately raising and lowering a small reservoir relative to the bed and thus causing water to flow alternately into and out of the bed. Another method, the "drip" method involves periodically flooding the bed from the top or permitting a controlled flow of nutrient to drip on the bed.

None of these methods has been satisfactory on a small scale. Moving parts, as in a two-way gravity system cause messy overflows as well as requiring a relatively expensive rack to hold the unit. The "drip" method causes a hole to be dug in the bed, thus exposing the plant roots and also results in excessive algae growth on the wet bed surface.

It is therefore an object of this invention to provide a unit hydroponicum suitable for houseplants wherein the unit is small; can be placed on a windowsill, a mantle, or a living room table; is readily portable, creates no mess, has no moving parts, and is relatively inexpensive.

It is a further object of the invention to provide such a unit hydroponicum suitable for the student's individual use where such unit would be readily portable from laboratory to classroom to study room.

I have now found that the foregoing and related objects can be secured by a structure for growing plants which comprises a vessel for holding a plant root supporting medium and a compressible reservoir for water. Watering or feeding of the plant, requires merely the squeezing or compressing of the reservoir.

Referring now to the drawings:

Figs. 1 to 8 are views wholly or partly in section illustrating various embodiments of the invention.

In Fig. 1 a vessel 10 is provided with an opening or port 11 to which is attached a compressible vessel 12; the latter being as illustrated, an ordinary rubber balloon. The vessel 10 is provided with a plant root supporting medium 13 such as gravel. A plant 14 is planted in the gravel in the normal manner. A supporting structure 15 serves the dual purpose of supporting the vessel 10 and of obscuring the balloon 12 in such cases where it is desired. Water or nutrient liquid contained in the reservoir 12 is forced into the vessel 10 when the reservoir is manually or otherwise compressed. The water returns to the reservoir by gravity flow when the compression is released.

Fig. 2 is similar to Fig. 1 and shows a variation in the shape of the vessel 10 and the supporting structure 15.

Fig. 3 is similar to the preceding figures except that the compressible nutrient reservoir 12 is constructed in a manner such that it can be compressed by moving the vessel 10 downwardly. A spring 16, which also serves as a supporting structure for the vessel 10, permits the vessel 10 to return to its original position after the force of the compression has been released. A series of openings 17, spaced from the bottom of the vessel 10 permit most but not all of the nutrient liquid to return to the reservoir 16 when the compression on the reservoir has been released.

Fig. 4 illustrates an embodiment of the invention which is similar to a so-called "planter." The vessel 10 takes the form of the planter which is an elongated rectangular structure to which is attached a compressible nutrient reservoir 12 in the shape of a box but which could be a balloon or a compressible bottle. The supporting structure 15 may take any esthetic form, such as the one shown, and may be made of plastic, metal, wood or the like.

In Figs. 5, 6, 7 and 8 the compressible nutrient reservoir 12 is shown as a squeeze bottle. In Fig. 5 the opening 11 in the vessel 10 is provided with a screw thread 18 by which it is attached to a similar screw thread 19 in the compressible bottle 12. Fitted into the opening 11 is a stopper 20 provided with an orifice 21. A tube 22 attached to the stopper 20 extends downwardly to substantially the bottom of the compressible bottle 12. The tube 22 serves the purpose of permitting water to be removed effectively when it is at a very low level in the bottle 12.

Fig. 6 shows a structure similar to Fig. 5 except that the siphon 23 permits a siphon return of water in the bottom of the vessel 10.

Fig. 7 shows a tube 22 with a portion, or chamber 24, of relatively wide diameter. A ball 25 positioned in the chamber 24 acts as a check valve in a manner such that when the compressible reservoir 12 is compressed the ball rises against the upper end of the chamber 24 and effects a restriction of upward flow of liquid. Similarly, when the compressive force is released on the compressible reservoir the ball moves downwardly against the lower end of the chamber 24 and restricts the return gravity flow of the fluid. A tube 26 leading from the side of the compressible reservoir 12 has its upper opening 27 directed above the vessel 10 and particularly against the stem of the plant. This latter effects a spray from the washing of plants particularly the lower stem which tends to be injured by the accumulation of nutrient salts as a result of the evaporation of the nutrient solution.

Fig. 8 illustrates an embodiment which permits a relatively large pool of nutrient solution to be retained on the bottom of the vessel 10 in order to prevent the plant root supporting medium from drying out. For this latter purpose vessel 10 is provided with a recessed portion 28 which lies below the opening 11 in the vessel 10.

The vessel 10 may be constructed of any convenient material such as glass, ceramic, plastic, wood and the like. It is usually necessary, however, that the material not be too transparent since the roots of most plants are injured by light.

The plant supporting medium may be gravel, vermiculite, coarse sand, soil, cinders, coal, glass beads and a wide variety of materials used either individually or in admixture. It is desirable that the supporting material be inert in the sense that it not include any soluble ingredient toxic to plants. The material itself should not be so fine as to cause exclusion of air from the roots of the plant. This can occur with extremely fine sand. Conversely, the material should not be so coarse that it will not retain a sufficient amount of moisture to last the plant for at least a day or several days.

It is of course not necessary to use a strictly inert material for the plant supporting medium. Ordinary garden soil can be used. In this latter instance it is recommended that a thin layer of gravel, vermiculite, or other medium which will act as a filter for the small soil particles be used below the soil in the vessel 10 in order to prevent the soil particles from being washed into the nutrient reservoir. Where soil is used it may be desirable to use substantially pure water instead of a nutrient solution. In this instrument, however, the term "water" is intended to cover pure water or water containing in solution or suspension various plant nutrients.

The compressible nutrient reservoir is best made from an ordinary rubber balloon or an ordinary squeeze bottle but a wide variety of compressible sources can be used. Materials suitable for use include polyethylene, neoprene, rubber, and similar materials.

The nutrient solution used will depend somewhat on the nature of the plant grown and many books and scientific articles have been written on this subject. In most instances where a nutrient solution is applied it is very surprising to note the small amount of space required for root growth. This is probably due to the fact that the root does not need to spread in order to find nutrient. Rather, the nutrient is brought to the root. For example, a carnation root which is grown in a hypdroponic solution in a unit of the type of this invention is very fine and hair-like and when fully mature can be put into an ordinary thimble. This can be contrasted with an ordinary soil grown carnation where one would have difficulty packing the root into a quart jar.

With plants that require a considerable amount of water it is important to design the vessel 10 in such a manner that it will retain a pool of water which cannot be drained away by gravity. As shown in the drawings this can be done by the use of upwardly extending ports, by the use of stoppers, or by depressing a portion of the vessel 10 below the drain.

Additions of water or nutrient solution can be made from time to time by pouring it into the upper vessel or by pouring it directly into the reservoir if the latter is readily detachable.

I claim:

1. A structure in which to grow plants comprising a vessel for holding a plant root supporting medium; a manually compressible water reservoir positioned below said first vessel; and a two way flow, subirrigating conduit extending from the bottom of said vessel into said reservoir; said conduit serving to carry water into the bottom of said vessel upon compression of said reservoir and serving to return said water to said reservoir by gravity flow upon release of said compression.

2. The structure according to claim 1 wherein the compressible reservoir is a balloon.

3. The structure according to claim 1 wherein the compressible reservoir is a compressible bottle.

4. The structure according to claim 1 wherein a relatively minor portion of said vessel lies below the upper end of said conduit.

References Cited in the file of this patent

UNITED STATES PATENTS

| 103,814 | Yates | May 31, 1870 |
| 327,673 | Gaillard | Oct. 6, 1885 |
| 340,129 | Kesel | Apr. 20, 1886 |
| 2,188,875 | Ellis | Jan. 30, 1940 |
| 2,198,150 | Barnhart | Apr. 23, 1940 |

FOREIGN PATENTS

| 4,398 | Germany | Mar. 19, 1879 |
| 93,331 | Germany | July 6, 1897 |
| 678 | Great Britain | of 1866 |

OTHER REFERENCES

Publication: "Soilesss Growth of Plants" (Ellis & Swaney), published by Reinhold (N. Y.) 1947. Second edition. Pages 71 and 72.